| (12) | United States Patent | (10) Patent No.: | US 10,167,044 B2 |
|---|---|---|---|
| | Nishikawa et al. | (45) Date of Patent: | Jan. 1, 2019 |

(54) NON-METALLIC BRACKET

(71) Applicant: Shimano Inc., Sakai, Osaka (JP)

(72) Inventors: Yusuke Nishikawa, Osaka (JP); Keiji Matsueda, Osaka (JP)

(73) Assignee: Shimano Inc., Osaka (JP)

( * ) Notice: Subject to any disclaimer, the term of this patent is extended or adjusted under 35 U.S.C. 154(b) by 425 days.

(21) Appl. No.: 15/012,258

(22) Filed: Feb. 1, 2016

(65) Prior Publication Data

US 2017/0217534 A1    Aug. 3, 2017

(51) Int. Cl.
*B62K 23/06*    (2006.01)
*B62L 3/02*    (2006.01)
*F15B 7/08*    (2006.01)

(52) U.S. Cl.
CPC .............. *B62L 3/023* (2013.01); *B62K 23/06* (2013.01); *F15B 7/08* (2013.01)

(58) Field of Classification Search
CPC . B62L 3/023; F15B 7/08; B62K 23/06; B60T 17/043; F16L 33/224
See application file for complete search history.

(56) References Cited

U.S. PATENT DOCUMENTS 6,527,303 B2 * 3/2003 Kariyama ............... B60T 1/065
 285/246
9,010,500 B2 * 4/2015 Uchida ................. F16L 33/224
 188/24.11

FOREIGN PATENT DOCUMENTS

DE    10 2013 100 141 A1    2/2014
EP    2 100 805 A1    9/2009

* cited by examiner

*Primary Examiner* — Abiy Teka
(74) *Attorney, Agent, or Firm* — Global IP Counselors, LLP (57) ABSTRACT

A non-metallic bracket for a bicycle hydraulic component is basically provided with a non-metallic body and a force receiving member. The non-metallic body has a hydraulic hose attachment port and an internal fluid passage. The hydraulic hose attachment port has an insertion opening disposed at an exterior surface of the non-metallic body and an internal attachment bore extending from the insertion opening towards the internal fluid passage. The internal attachment bore of the hydraulic hose attachment port includes an internal screw thread portion that threadedly receives a hose fastening fitting. The force receiving member is provided to the non-metallic body so as to receive force applied to the non-metallic body in an area of the hydraulic hose attachment port caused by screwing the hose fastening fitting into the internal screw thread portion of the non-metallic body.

21 Claims, 7 Drawing Sheets

NON-METALLIC BRACKET

BACKGROUND

Field of the Invention

This invention generally relates to a non-metallic bracket. More specifically, the present invention relates to a non-metallic bracket for a bicycle hydraulic component.

Background Information

A hydraulic bicycle system is well known for connecting hydraulic components with a hydraulic hose. A first hydraulic component, such as a brake lever, is fluidly coupled to a second hydraulic component, such as a brake caliper, by the hydraulic hose. The second hydraulic component is hydraulically controlled by hydraulic fluid flowing through the hydraulic hose in response to operation of the first hydraulic component. The hydraulic hose is coupled to metallic bodies of the hydraulic components.

SUMMARY

Generally, the present disclosure is directed to various features of a non-metallic bracket for a bicycle hydraulic component. In one feature, a non-metallic bracket for a bicycle hydraulic component is provided in which a force receiving member is disposed in a non-metallic body of the non-metallic bracket.

In view of the state of the known technology and in accordance with a first aspect of the present disclosure, a non-metallic bracket for a bicycle hydraulic component is provided that basically comprises a non-metallic body and a force receiving member. The non-metallic body has a hydraulic hose attachment port and an internal fluid passage. The hydraulic hose attachment port has an insertion opening disposed at an exterior surface of the non-metallic body and an internal attachment bore extending from the insertion opening towards the internal fluid passage. The internal attachment bore of the hydraulic hose attachment port includes an internal screw thread portion that threadedly receives a hose fastening fitting. The force receiving member is provided to the non-metallic body so as to receive force applied to the non-metallic body in an area of the hydraulic hose attachment port caused by screwing the hose fastening fitting into the internal screw thread portion of the non-metallic body.

In accordance with a second aspect of the present invention, the non-metallic bracket according to the first aspect is configured so that the force receiving member is disposed within a portion of the internal attachment bore that is between the internal screw thread portion and the internal fluid passage.

In accordance with a third aspect of the present invention, the non-metallic bracket according to the second aspect is configured so that the force receiving member includes a tubular insert disposed in the internal attachment bore of the hydraulic hose attachment port. The tubular insert has a bushing contact surface that at least partially faces in an axial direction of the internal attachment bore of the hydraulic hose attachment port.

In accordance with a fourth aspect of the present invention, the non-metallic bracket according to the third aspect is configured so that the bushing contact surface tapers towards a center axis of the internal attachment bore in a direction away from the insertion opening.

In accordance with a fifth aspect of the present invention, the non-metallic bracket according to the third or fourth aspect is configured so that the tubular insert is a metallic member.

In accordance with a sixth aspect of the present invention, the non-metallic bracket according to one of the third to fifth aspects is configured so that the internal attachment bore has a deformable seal portion configured to be deformed by the tubular insert with force produced by screwing the hose fastening fitting into the internal screw thread portion of the non-metallic body.

In accordance with a seventh aspect of the present invention, the non-metallic bracket according to the sixth aspect is configured so that the deformable seal portion includes a protrusion provided on the non-metallic body.

In accordance with an eighth aspect of the present invention, the non-metallic bracket according to the seventh aspect is configured so that the non-metallic body has a step portion between the internal attachment bore and the internal fluid passage. The protrusion is provided on the step portion.

In accordance with a ninth aspect of the present invention, the non-metallic bracket according to one of the third to eighth aspects is configured so that the tubular insert has a flange portion extending radially inward towards a center axis of the internal attachment bore.

In accordance with a tenth aspect of the present invention, the non-metallic bracket according to the ninth aspect is configured so that the flange portion defines an inner surface that tapers towards the center axis in a direction away from the insertion opening.

In accordance with an eleventh aspect of the present invention, the non-metallic bracket according to the tenth aspect is configured so that the tubular insert is a continuous annular member with the bushing contact surface and the inner surface being conically shaped.

In accordance with a twelfth aspect of the present invention, the non-metallic bracket according to the first aspect is configured so that the force receiving member includes a support ring disposed on a portion of the exterior surface of the non-metallic body that encircles the internal attachment bore of the hydraulic hose attachment port.

In accordance with a thirteenth aspect of the present invention, the non-metallic bracket according to the twelfth aspect is configured so that the support ring is a metallic member.

In accordance with a fourteenth aspect of the present invention, the non-metallic bracket according to the twelfth aspect is configured so that the non-metallic body includes a recess on which the support ring is disposed.

In accordance with a fifteenth aspect of the present invention, the non-metallic bracket according to the twelfth aspect is configured so that the support ring has an axial length that is smaller than a depth of the recess such that an axial force produced by screwing the hose fastening fitting into the internal screw thread portion of the non-metallic body is not transmitted to the non-metallic body via the support ring.

In accordance with a sixteenth aspect of the present invention, the non-metallic bracket according to one of the third to eleventh aspects is configured so that the force receiving member further includes a support ring disposed on a portion the exterior surface of the non-metallic body that encircles the internal attachment bore of the hydraulic hose attachment port.

In accordance with a seventeenth aspect of the present invention, the non-metallic bracket according to one of the first to sixteenth aspects is configured so that the non-metallic body further has a gripping portion and a handlebar receiving recess disposed at an end of the gripping portion.

In accordance with an eighteenth aspect of the present invention, the non-metallic bracket according to the seventeenth aspect further comprises a bracket cover overlying the gripping portion of the non-metallic body.

In accordance with a nineteenth aspect of the present invention, the non-metallic bracket according to the eighteenth aspect is configured so that the bracket cover is made of an elastic material.

In accordance with a twentieth aspect of the present invention, the non-metallic bracket according to one of the first to nineteenth aspects is configured so that the non-metallic body is made of a resin material.

In accordance with a twenty-first aspect of the present invention, a bicycle hydraulic actuating device including the non-metallic bracket according to one of the first to twentieth aspects is configured so that an operating member is movably mounted to the non-metallic bracket and a piston is operatively coupled to the operating member. The piston is movably disposed in a hydraulic chamber supported by the non-metallic bracket in response to operation of the operating member.

In accordance with a twenty-second aspect of the present invention, the bicycle hydraulic actuating device according to the twenty-first aspect further comprises a hose fastening fitting including an external screw thread portion threadedly coupled to the internal screw thread portion of the non-metallic bracket. The external screw thread portion has a tapered portion tapering towards a center axis of the internal attachment bore in a direction away from the insertion opening.

Also other objects, features, aspects and advantages of the disclosed non-metallic bracket will become apparent to those skilled in the art from the following detailed description, which, taken in conjunction with the annexed drawings, discloses one illustrative embodiment of the non-metallic bracket.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Figure 1:
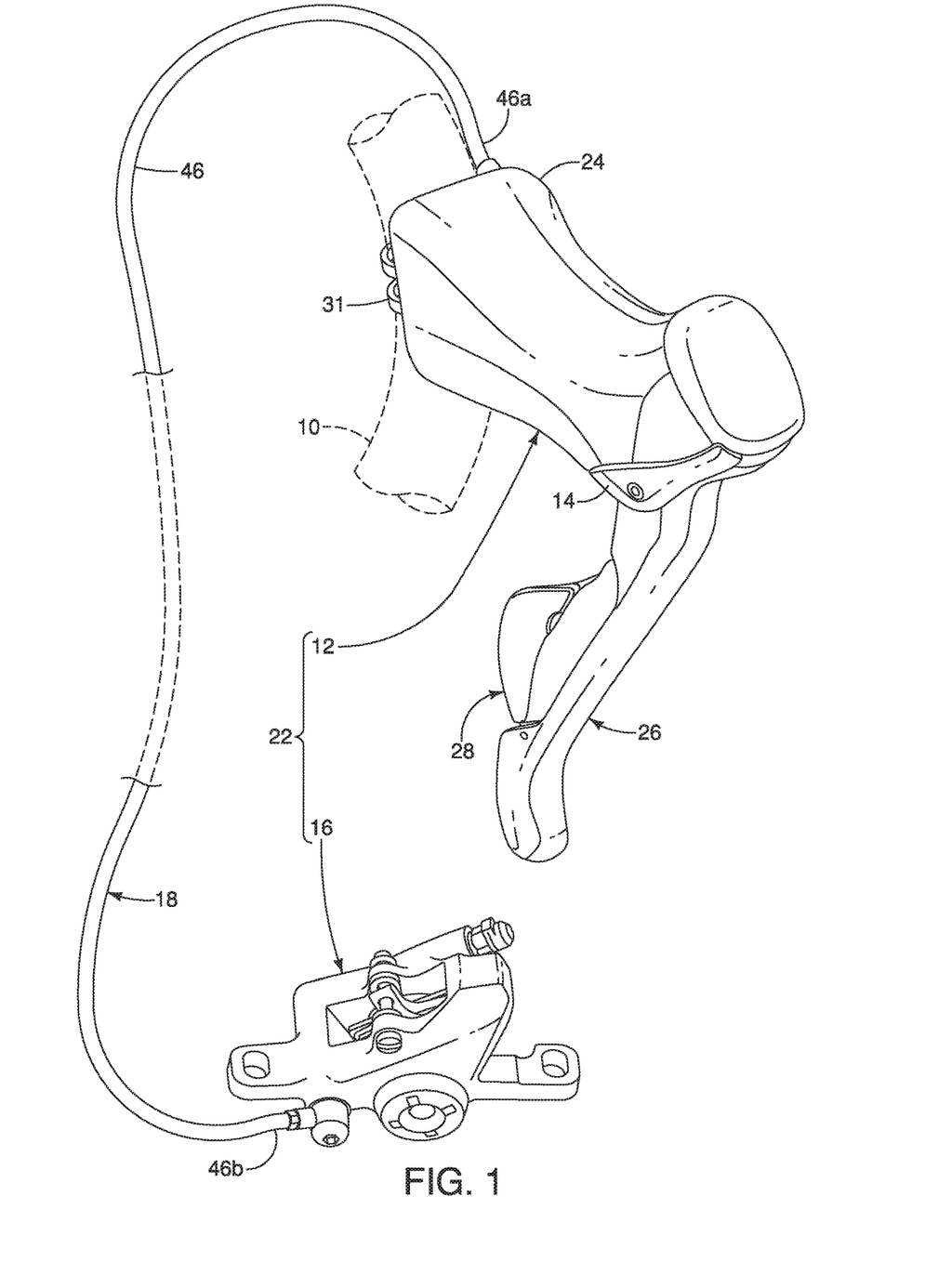
FIG. 1 is a perspective view of a portion of a bicycle handlebar that is equipped with a bicycle operating device having a non-metallic bracket in accordance with one illustrated embodiment.

Referring initially to FIG. 1, a portion of a bicycle handlebar 10 is illustrated that is equipped with a bicycle operating device, or bicycle hydraulic actuating device, 12 having a non-metallic bracket 14 in accordance with a first exemplary embodiment. Here, the bicycle operating device 12 is an example of a bicycle hydraulic component. More specifically, the bicycle operating device 12 of the first exemplary embodiment is a brake operating device (i.e., a bicycle hydraulic component) that is fluidly connected to a bicycle disc brake caliper 16 (i.e., a bicycle hydraulic component) via a hydraulic hose structure 18.

Referring initially to FIG. 1, a hydraulic brake system 22 is illustrated that includes the bicycle operating device 12 operatively coupled with the hydraulic hose structure 18 (e.g., a hydraulic bicycle hose structure). The hydraulic brake system 22 includes a disc brake rotor (not shown) that is fixedly attached to a hub (not shown) of a bicycle wheel (not shown). The bicycle operating device 12 and the brake caliper 16 include conventional bicycle components that are hydraulically operated in a conventional manner, unless otherwise specified below. Because these components are conventional, they will not be discussed and/or illustrated in detail herein. Furthermore, the bicycle operating device 12 is installed to a bicycle. Bicycles and their various components are well-known in the prior art, and thus, the bicycles and its various components will not be discussed or illustrated in detail herein, except for the components of the bicycle operating device 12. In other words, only the bicycle operating device 12 will be discussed and illustrated in detail herein. Moreover, because most bicycle operating devices are well known to those skilled in the art, the bicycle operating device 12 will only be discussed and illustrated to the extent needed to understand the present disclosure.

As illustrated in FIG. 1, the bicycle operating device, or bicycle hydraulic component, 12 includes the non-metallic bracket 14 and an operating member 26. The non-metallic bracket 14 is configured to be mounted to the bicycle handlebar 10. The operating member 26 is movably mounted to the non-metallic bracket 14 about pivot member 26a. As explained below, the operating member 26 is biased to a rest position with respect to the non-metallic bracket 14. The operating member 26 actuates the hydraulic brake system 22 upon movement of the operating member 26 relative to the non-metallic bracket 14 to perform a braking operation of the brake caliper 16 of the hydraulic brake system 22.

As seen in FIG. 1, the bicycle operating device 12 further includes a shift operating member 28. The shift operating member 28 is provided on the operating member 26 and is configured to be electrically connected to a bicycle electric component, such as a shifting device (not shown). The shift operating member 28 is configured to perform chain or gear shifting operations of the shifting device. Because various electrical shifting systems are known in the bicycle field, the shift operating member 28 will not be discussed herein for the sake of brevity.

Figure 2:
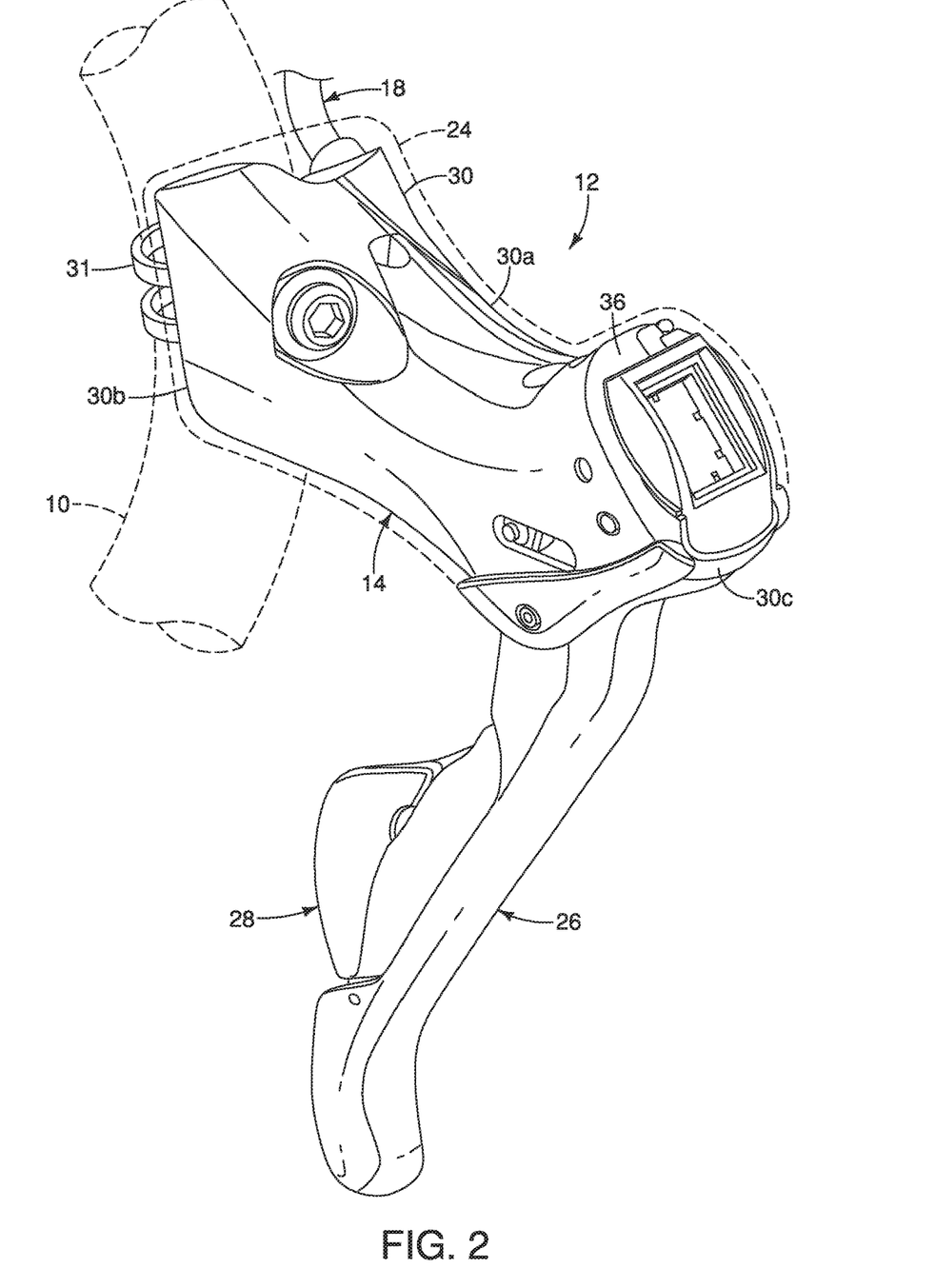
FIG. 2 is a perspective view of the bicycle operating device illustrated in FIG. 1 with a bracket cover shown in broken lines.

As shown in FIGS. 1 and 2, the non-metallic bracket 14 includes a non-metallic body 30 and an attachment member 31. The non-metallic body 30 basically has a gripping portion 30a. The attachment member 31 and the non-metallic body 30 are capable of clamping the handlebar 10 of the bicycle therebetween. The gripping portion 30a is provided configured to be gripped by a rider during riding. The attachment member 31 is a conventionally-known band-shaped member, and the bicycle operating device 12 can be fixed to the handlebar 10 by fastening the attachment member 31 with respect to the non-metallic body 30 by a screw.

Figure 3:
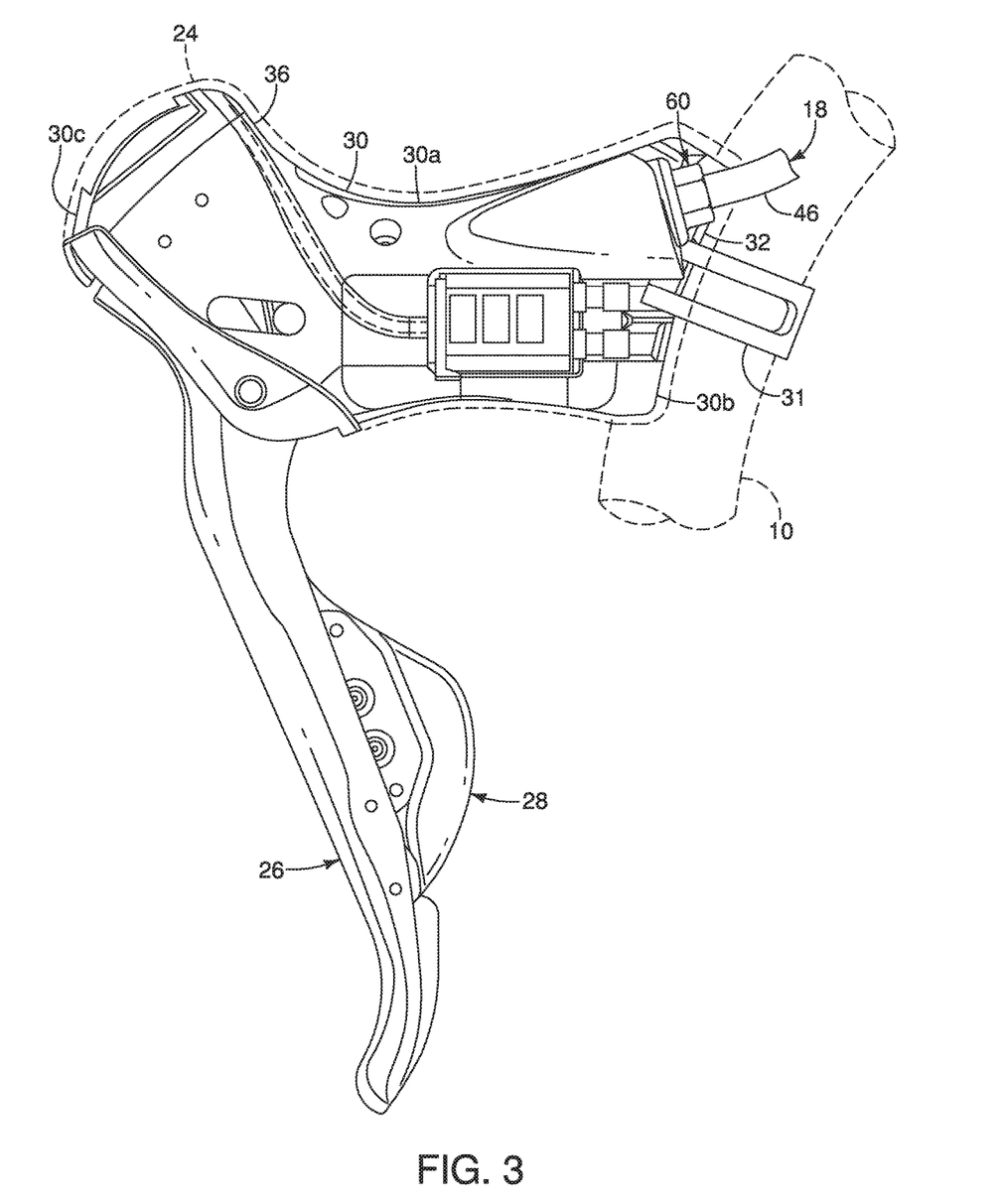
FIG. 3 is an elevational view of a portion of the non-metallic bracket of the bicycle operating device illustrated in FIGS. 1 and 2.
Figure 4:
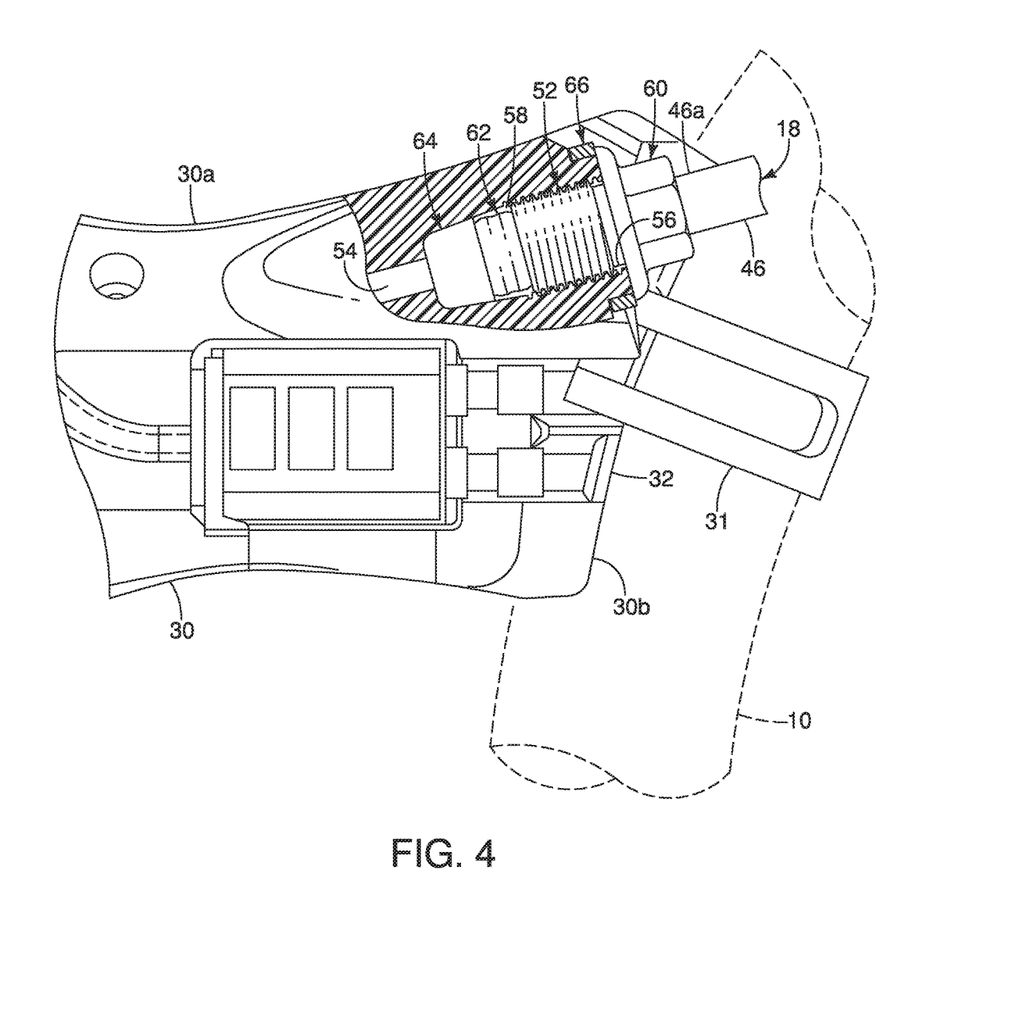
FIG. 4 is a partial cross sectional view of a hydraulic attachment port of the non-metallic bracket illustrated in FIGS. 1 to 3.

As shown in FIG. 3, the gripping portion 30a extends longitudinally between a first end 30b and a second end 30c of the non-metallic body 30. The non-metallic bracket 14 further includes a bracket cover 24 overlying the gripping portion 30a of the non-metallic body 30. The gripping portion 30a is at least partially covered by the bracket cover 24. The non-metallic body 30 is made of a non-metallic material, such as a resin material. The bracket cover 24 is made of an elastic material, such as a rubber material. The bracket cover 24 overlies a gripping portion 30a of the non-metallic body 30. The bracket cover 24 is preferably removably attached to the non-metallic body 30.

The top or upper surface of the non-metallic body 30 has a downward-curving shaped surface to facilitate gripping of the gripping portion 30a by hand. A handlebar receiving recess 32 is formed on the first end 30b side of the non-metallic body 30. The handlebar receiving recess 32 is configured to curve to follow the curved part of the handlebar 10. In other words, the handlebar receiving recess 32 is disposed at an end of the gripping portion 30a of the non-metallic body 30. The gripping portion 30a of the non-metallic body 30 is disposed at a substantially middle portion of the non-metallic body 30. A pommel portion 36 is formed on the second end 30c side of the non-metallic body 30. In other words, the pommel portion 36 is disposed at an opposite end of the gripping portion 30a from the handlebar receiving recess 32 such that the gripping portion 30a is disposed between the handlebar receiving recess 32 and the pommel portion 36.

In the illustrated embodiment, the handlebar attachment member 31, the gripping portion 30a and the pommel portion 36 are integrally provided as a one-piece unitary member. Of course, the handlebar attachment member 31, the gripping portion 30a and the pommel portion 36 can have removable members as needed and/or desired.

As illustrated in FIGS. 1 and 2, the bracket cover 24 is stretched over the gripping portion 30a and at least part of the pommel portion 36 to provide a cushion to the gripping portion 30a of the non-metallic body 30 and to provide an attractive appearance. However, it will be apparent to those skilled in the bicycle field that the material of the bracket cover 24 is not limited to an elastic material and any appropriate material can be applied to the bracket cover 24 if needed and/or desired.

Figure 6:
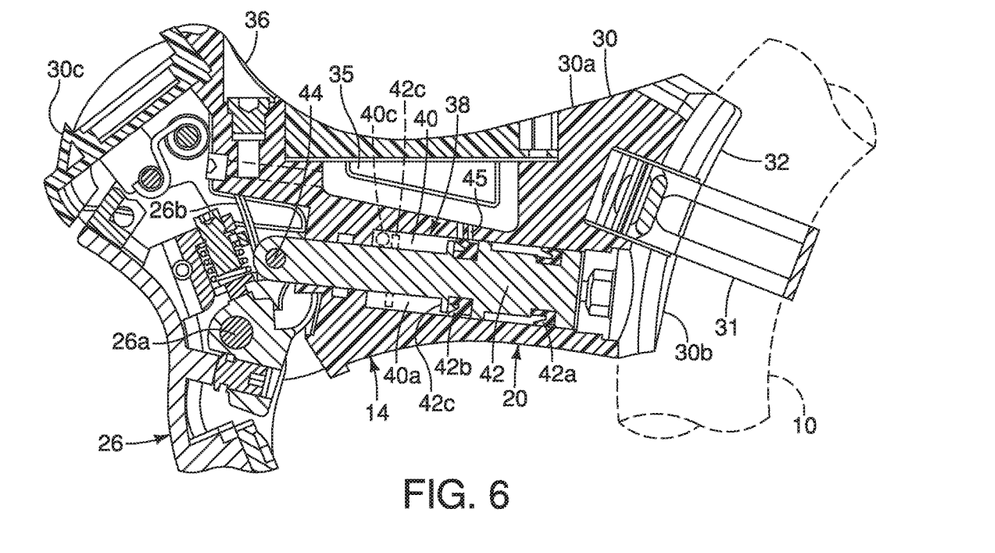
FIG. 6 is a center cross sectional view of the non-metallic bracket illustrated in FIGS. 1 to 3.

As shown in FIGS. 1 and 6, a hydraulic fluid pressure generator 38 is provided in order to provide hydraulic pressure to the brake caliper 16 and cause the brake caliper 16 to brake. The hydraulic fluid pressure generator 38 includes a hydraulic chamber, or cylinder, 40 and a piston 42. The hydraulic chamber 40 is formed in the non-metallic body 30. The piston 42 moves linearly within the hydraulic chamber 40 (i.e., reciprocates linearly within the hydraulic chamber 40). The piston 42 is mechanically coupled to the operating member 26 by a pin 44 such that operation of the operating member 26 moves the piston 42 through the hydraulic chamber 40 (to the left as seen in FIG. 6). A reservoir 35 is fluidly coupled to the hydraulic chamber 40 by a hydraulic fluid channel 45. The hydraulic fluid pressure generator 38 generates hydraulic pressure through the operation of the piston 42 in an insertion direction of the hydraulic chamber 40.

Figure 5:
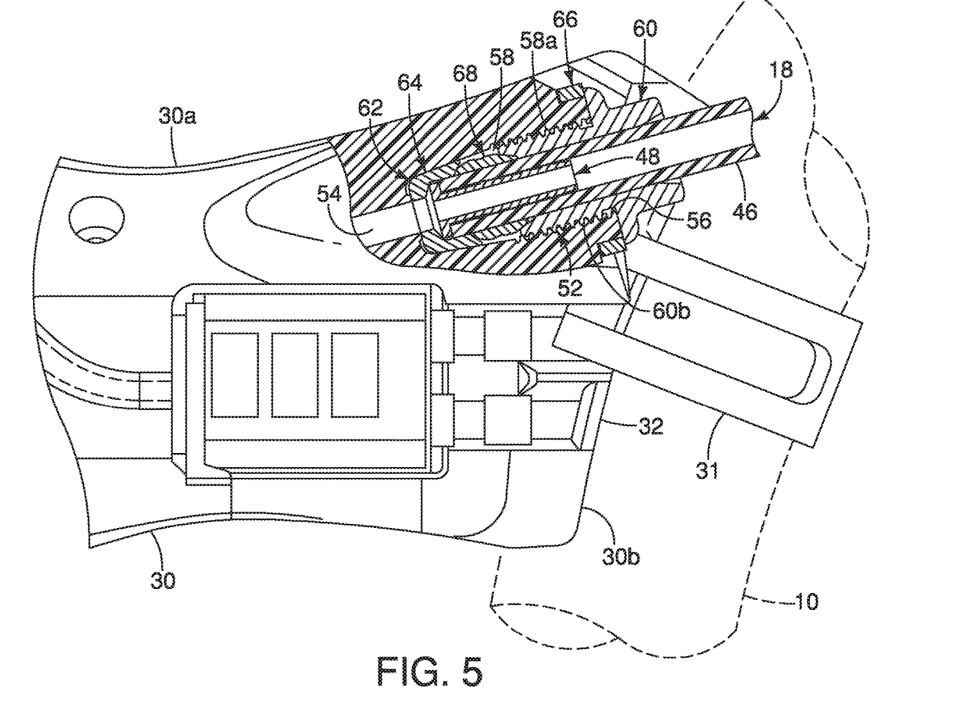
FIG. 5 is a partial cross sectional view of an internal attachment bore of the hydraulic attachment port of the non-metallic bracket illustrated in FIG. 4.

The piston 42 has a first seal member 42a and a second seal member 42b installed on the outer circumferential surface of the piston 42. The first seal member 42a and the second seal member 42b have, for example, an O-ring shape. The first seal member 42a and the second seal member 42b are provided to seal the gap between the inner circumferential surface of the movement space 40a of the hydraulic chamber 40 and the outer circumferential surface of the piston 42. Alternatively, the piston 42 can have only one seal member. The piston 42 moves within the movement space 40a of the hydraulic chamber 40 in response to a braking operation performed by the operating member 26. Accordingly, the piston 42 is operatively coupled to the operating member 26, and movably disposed in the hydraulic chamber 40 of the non-metallic bracket 14 in response to operation of the operating member 26. A biasing member 26b, such as a spring, biases the piston 42 to a rest position. The hydraulic fluid pressure generator 38 further includes an opening 40c that fluidly communicates with an internal fluid passage 54 (as seen in FIG. 5) to convey hydraulic pressure generated in the hydraulic chamber 40 to the brake caliper 16 through the hydraulic hose structure 18. Operation of the operating member 26 about pivot member 26a pulls the piston 42 through the hydraulic chamber 40 such that a flange 42c of the piston 42 moves from a rest position indicated with a solid line to a brake operated position indicated with a dashed line in FIG. 6.

Figure 7:
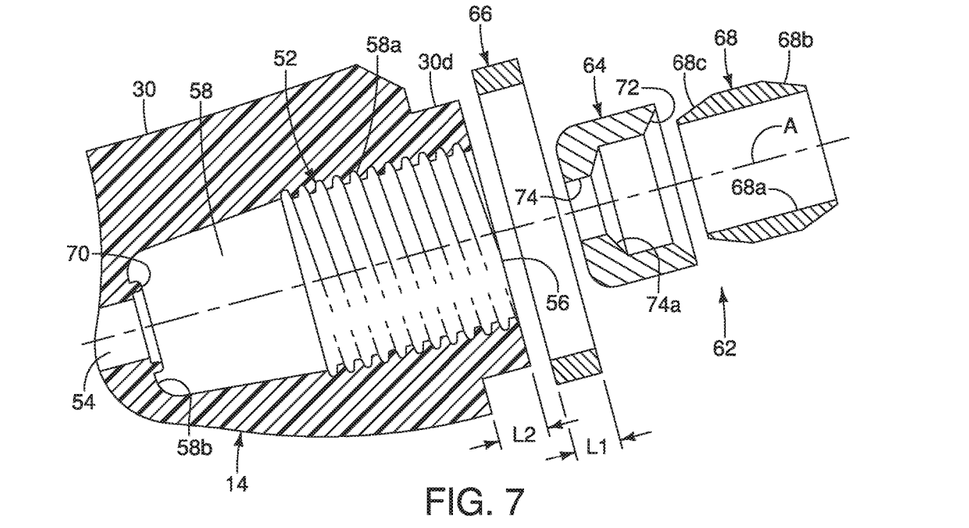
FIG. 7 is an exploded center cross sectional view of the hydraulic attachment port of FIG. 5.
Figure 8:
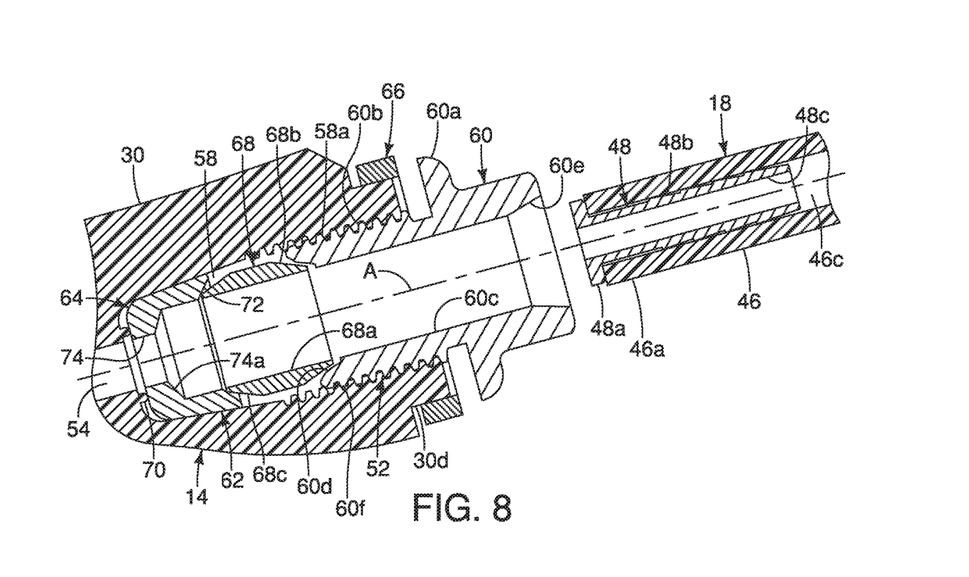
FIG. 8 is a cross sectional view of the hydraulic attachment port of FIG. 5 prior to receiving a hydraulic hose structure.
Figure 9:
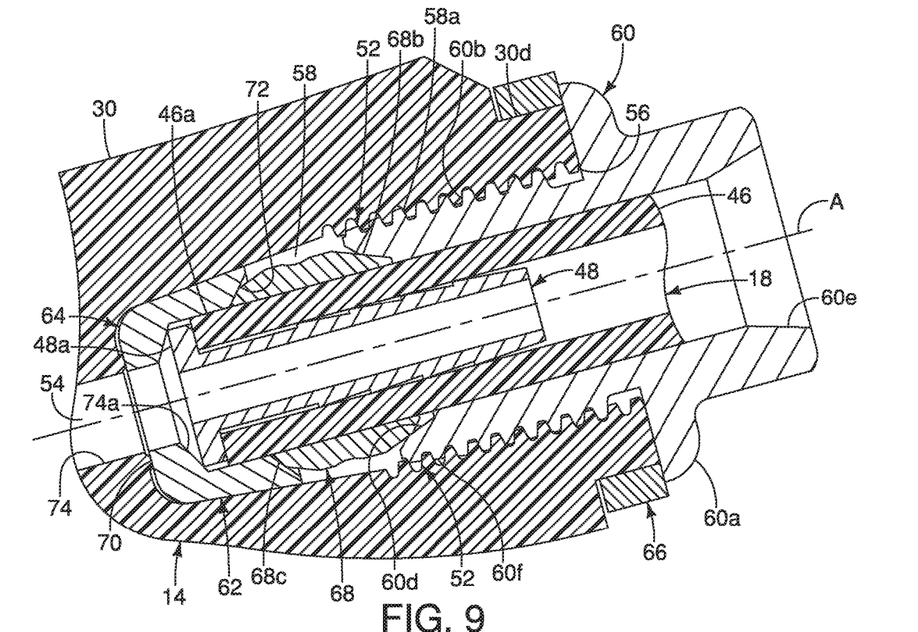
FIG. 9 is a cross sectional view of the hydraulic attachment port of FIG. 8 after receiving the hydraulic hose structure.

Referring now to FIGS. 1 and 4 to 9, the hydraulic brake system 22 will now be discussed. As seen in FIGS. 1, 5 and 6, the brake caliper 16 and the hydraulic chamber 40 are fluidly coupled together by the hydraulic hose structure 18. As seen in FIGS. 5, 8 and 9, the hydraulic hose structure 18 basically includes a flexible tube 46 (e.g., hydraulic hose) which forms the hydraulic brake hose. The flexible tube 46 is a conventional flexible tube that is used for conveying hydraulic fluid from the hydraulic chamber 40 (FIG. 6) to the brake caliper 16 under pressure. A first end portion 46a of the flexible tube 46 of the hydraulic hose structure 18 is coupled to the hydraulic chamber 40 and a second end portion 46b of the flexible tube 46 of the hydraulic hose structure 18 is coupled to the brake caliper 16. The flexible tube 46 has an interior passage 46c extending between the openings of the first and second end portions 46a and 46b of the flexible tube 46. As shown in FIG. 8, the first end portion 46a of the flexible tube 46 of the hydraulic hose structure 18 includes a rigid insert 48. The second end portion 46b of the flexible tube 46 of the hydraulic hose structure 18 is similarly configured such that a description thereof is omitted for brevity.

The rigid insert 48 has an annular flange section 48a and a tubular section 48b. A longitudinal passageway 48c passes through the tubular section 48b and the flange section 48a. The outer surface of the tubular section 48b has a plurality of inclined barbs such that the tubular section 48b is securely retained in the interior passage 46c of the flexible tube 46. The rigid insert 48 is designed to be retained in the first end portion 46a of the flexible tube 46 and to provide radial support at the first end portion 46a of the flexible tube 46. Accordingly, the rigid insert 48 is constructed of a rigid material, such as a metallic material. For example, the rigid insert 48 can be formed of a copper or a copper alloy. Of course, any suitable rigid material can be utilized for the rigid insert 48 as needed and/or desired.

The non-metallic body 30 has a hydraulic hose attachment port 52 and the internal fluid passage 54, as shown in FIGS. 6 and 7. The hydraulic hose attachment port 52 has an insertion opening 56 disposed at an exterior surface of the non-metallic body 30 and an internal attachment bore 58 extending from the insertion opening 56 towards the internal fluid passage 54. The internal attachment bore 58 of the hydraulic hose attachment port 52 includes an internal screw thread, or threaded, portion 58a that threadably receives a hose fastening fitting 60. The internal screw thread portion 58a extends from the insertion opening 56 towards the internal fluid passage 54. A step portion 58b is disposed between the internal screw thread portion 58a of the internal attachment bore 58 and the internal fluid passage 54. The internal fluid passage 54 extends from the hydraulic chamber 40 to the internal attachment bore 58, thereby fluidly communicating the hydraulic chamber 40 with the connected hydraulic hose structure 18.

A force receiving member 62 is provided to the non-metallic body 30 to receive force applied to the non-metallic body 30 in an area of the hydraulic hose attachment port 52 caused by screwing the hose fastening fitting 60 into the internal screw thread portion 58a of the non-metallic body 30. In this embodiment, the force receiving member 62 includes a tubular insert 64 and a support ring 66. The tubular insert 64 is disposed in the internal attachment bore 58 of the non-metallic body 30, as shown in FIGS. 5, 8 and 9, to receive force applied to the non-metallic body 30 in an area of the hydraulic hose attachment port 52 caused by screwing the hose fastening fitting 60 into the internal screw thread portion 58a of the non-metallic body 30. The tubular insert 64 is disposed within a portion of the internal attachment bore 58 that is between the internal screw thread portion 58a and the internal fluid passage 54, as shown in FIGS. 8 and 9. A bushing 68 is disposed between the tubular insert 64 and the hose fastening fitting 60.

The tubular insert 64 has a bushing contact surface 72 that at least partially faces in an axial direction of the internal attachment bore 58 of the hydraulic hose attachment port 52. As shown in FIGS. 7 and 8, the bushing contact surface 72 tapers toward a center axis A of the internal attachment bore 58 in a direction away from the insertion opening 56. The tubular insert 64 has a flange portion 74, as shown in FIG. 7, which extends radially inward towards the center axis A of the internal attachment bore 58. The flange portion 74 defines an inner surface 74a that tapers towards the center axis A in a direction away from the insertion opening 56. The tubular insert 64 is a continuous annular member with the bushing contact surface 72 and the inner surface 74a being conically shaped.

The tubular insert 64 is constructed of a rigid material, such as a metallic material. Of course, any suitable rigid material can be utilized for the tubular insert 64 as needed and/or desired. Accordingly, the tubular insert 64 can be a metallic member. The rigidity of the tubular insert 64 facilitates deformation of the bushing 68 when the hose fastening fitting 60 is tightened.

As seen in FIGS. 7 and 8, the bushing, or olive, 68 has an internal passage 68a passing therethrough. The bushing has a first contact surface 68b facing toward the insertion opening 56 and a second contact surface 68c facing away from the insertion opening 56. The first contact surface 68b tapers away from the center axis A of the internal attachment bore 58 in a direction away from the insertion opening 56. The second contact surface 68c tapers toward the center axis A of the internal attachment bore 58 in a direction away from the insertion opening 56. The second contact surface 68c of the bushing 68 is configured to engage the bushing contact surface 72 of the tubular insert 64, as shown in FIGS. 5, 8 and 9. The bushing contact surface 72 of the tubular insert 64 limits insertion of the bushing in a direction towards the internal fluid passage 54 because the diameter of the bushing contact surface 72 is less than an outer diameter of the bushing 68 at the second contact surface 68c. When assembled, the bushing 68 is disposed between the tubular insert 64 and the hose fastening fitting 60. Accordingly, the bushing 68 is constructed of a rigid material, such as a metallic material. Of course, any suitable rigid material can be utilized for the bushing 68 as needed and/or desired.

The support ring 66 is an annular member, as shown in FIGS. 7 and 8. The support ring 66 is disposed on a portion of the exterior surface of the non-metallic body 30 that encircles the internal attachment bore 58 of the hydraulic hose attachment port 52, to receive force applied to the non-metallic body 30 in an area of the hydraulic hose attachment port 52 caused by screwing the hose fastening fitting 60 into the internal screw thread portion 58a of the non-metallic body 30. As shown in FIG. 7, the non-metallic body 30 includes a recess 30d on which the support ring 66 is disposed.

The support ring 66 is constructed of a rigid material, such as a metallic material. Of course, any suitable rigid material can be utilized for the support ring 66 as needed and/or desired. Accordingly, the support ring 66 can be a metallic member. The rigidity of the support ring 66 substantially prevents deformation of the non-metallic body 30 when the hose fastening fitting 60 is tightened. The support ring 66 substantially prevents outward deformation of the non-metallic body 30 in the portion that encircles the internal attachment bore of the hydraulic hose attachment port 52. As seen in FIG. 7, an axial length L1 of the support ring 66 is smaller than a depth L2 of the recess 30d such that an axial force produced by screwing the hose fastening fitting 60 into the internal screw thread portion 58a of the non-metallic body 30 is not transmitted to the non-metallic body 30 via the support ring 66.

A deformable seal 70 is disposed in the internal attachment bore 58, as seen in FIG. 7. The deformable seal 70 includes a protrusion provided on the non-metallic body 30. Preferably, the deformable seal 70 is an annular protrusion formed unitarily as one-piece with the non-metallic body 30. The protrusion is provided on the step portion 58b of the attachment bore 58. The deformable seal 70 is configured to be deformed by the tubular insert 64 with force produced by screwing the hose fastening fitting 60 into the internal screw thread portion 58a of the non-metallic body 30, as shown in FIG. 9. The deformation of the deformable seal 70 provides a seal between the tubular insert 64 and the non-metallic body 30 to prevent leakage of the hydraulic fluid upon connection of the hydraulic hose structure 18. Alternatively, any suitable seal member can be used between the tubular insert 64 and the non-metallic body 30 to seal the hydraulic attachment port 52 upon connection of the hydraulic hose structure 18. For example, the deformable seal 70 can be a substantially annular member that is press fit in the attachment bore 58 to engage the step portion 58b thereof, such that deformation of the deformable seal 70 upon connection of the hydraulic hose structure 18 forms a seal between the tubular insert 64 and the non-metallic body 30.

Figure 10:
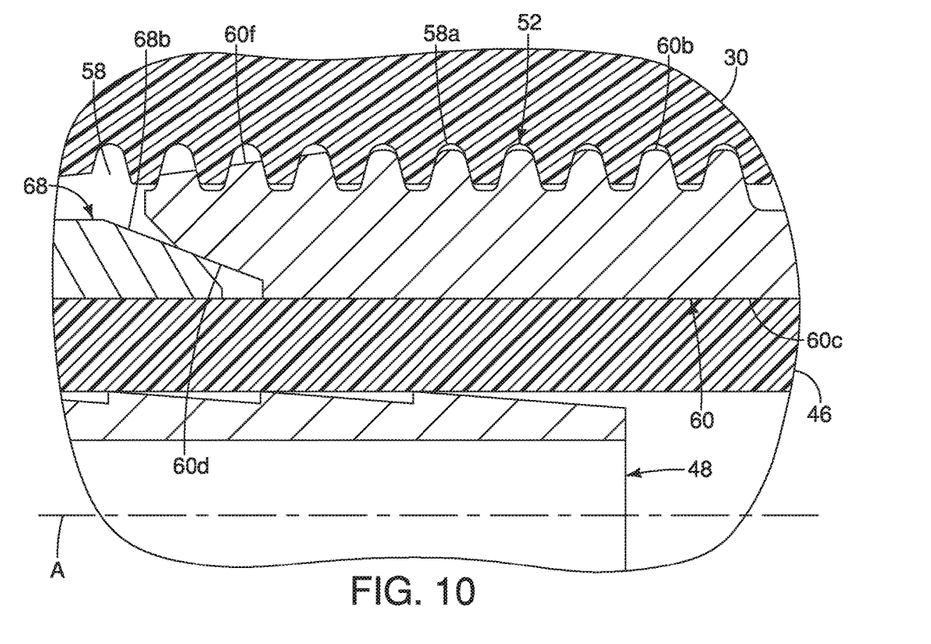
FIG. 10 is a cross sectional view of a tapered portion of an external screw thread portion of a hose fastening fitting threadedly coupled to an internal screw thread portion of the non-metallic bracket of FIG. 9.

The hose fastening fitting 60 is configured to be received by hydraulic hose attachment port 52. As seen in FIGS. 5, 8 and 9, the hose fastening fitting 60 has a flange portion 60a and an external screw thread, or threaded, portion 60b extending from the flange portion 60a. The external screw thread portion 60b is configured to be received by the internal screw thread portion 58a of the attachment bore 58. In other words, when the hose fastening fitting 60 is coupled to the non-metallic bracket 14, the external screw thread portion 60b is threadedly coupled to the internal screw thread portion 58a of the non-metallic bracket 14. As shown in FIGS. 8 to 10, the external screw thread portion 60b has a tapered portion 60f tapering towards a center axis A of the internal attachment bore 58 in a direction away from the insertion opening 56. The tapered portion 60f is disposed at an end of the external screw thread portion 60b opposite the flange portion 60a. A longitudinal passage 60c extends through the hose fastening fitting 60. An engagement portion 60d of the hose fastening fitting 60 is configured to engage the first contact surface 68b of the bushing 68 when the first end portion 46a of the hydraulic hose structure 18 is secured to the non-metallic body 30. The engagement portion 60d of the hose fastening fitting 60 is preferably a tapered surface to facilitate engagement with the first contact surface 68b of the bushing 68. The engagement portion tapers away from the center axis A of the internal attachment bore 58 in a direction away from the insertion opening 56. The longitudinal passage 60c has an inwardly tapered portion 60e configured to facilitate insertion of the first end portion 46a of the flexible tube 46 of the hydraulic hose structure 18. The inwardly tapered portion 60e is disposed at an opposite end of the longitudinal passage 60c of the hose fastening fitting 60 from the engagement portion 60b. Accordingly, the hose fastening fitting 60 is constructed of a rigid material, such as a metallic material. Of course, any suitable rigid material can be utilized for the hose fastening fitting 60 as needed and/or desired.

Now, a method of assembly of each of the components of the hydraulic brake system 22, and a method of assembly of the hydraulic brake system 22 will be discussed in which the hydraulic brake system 22 can be assembled in a relatively easy manner without substantially plastically deforming the non-metallic body 30, thereby facilitating reliable and stable repeated connections of the hydraulic hose structure 18. Unless otherwise specified, the following method of assembling the hydraulic brake system 22 can be performed in a different order than discussed herein. In other words, the method of assembling the hydraulic brake system 22 is not limited to the following described order of assembly unless otherwise specified.

As seen in FIG. 8, the tubular insert 64 and the bushing 68 are disposed in the internal attachment bore 58, the hose fastening fitting 60 is threadably engaged with the internal screw thread portion 58a of the internal attachment bore 58, and the support ring 66 is disposed on the exterior surface of the non-metallic body 30 prior to the first end portion 46a of the flexible tube 46 of the hydraulic hose structure 18 being coupled to the hydraulic hose attachment port 52 of the non-metallic body 30. The flange portion 60a of the hose fastening fitting 60 is spaced from the exterior surface of the non-metallic body 30 prior to securing the hydraulic hose structure 18 thereto. The deformable seal portion 70 is not deformed prior to a first insertion of the hydraulic hose structure 18.

Next, as seen in FIGS. 5 and 9, the first end portion 46a of the flexible tube 46 is inserted through the hose fastening fitting 60. The inwardly tapered portion 60e of the hose fastening fitting 60 facilitates insertion of the first end portion 46a of the flexible tube 46 in the hose fastening fitting 60. The first end portion 46a is inserted through the hose fastening fitting 60 and through the support ring 66 until the flange section 48a abuts the inner surface 74a of the flange portion 74 of the tubular insert 64. The inner surface 74a of the flange portion 74 limits an insertion depth of the first end portion 46a of the hydraulic hose structure 18 into the internal attachment bore 58 of the non-metallic body 30.

The hose fastening fitting 60 is then threaded into the internal attachment, bore 58 to secure the first end portion 46a of the hydraulic hose structure 18 to the non-metallic body 30 of the non-metallic bracket 14. As the hose fastening fitting 60 is tightened, the engagement portion 60d of the hose fastening fitting 60 engages the first contact surface 68b of the bushing 68, as shown in FIGS. 5 and 9, thereby deforming the hushing 68. The hose fastening fitting 60 is configured to be tightened until the flange portion 60a engages the exterior surface of the non-metallic body 30. Screwing the hose fastening fitting 60 into the internal screw thread portion 58a of the internal attachment bore 58 causes an axial force to be transmitted through the bushing 68 and the tubular insert 64, thereby deforming the deformable seal portion (70, FIGS. 7 and 8). The deformed deformable seal portion 70 forms a seal between the tubular insert 64 and the non-metallic body 30 to substantially prevent leakage of the hydraulic fluid.

Tightening of the hose fastening fitting 60 also causes deformation of the bushing 68, as shown in FIGS. 5 and 9. The first contact surface 68b of the bushing 68 is engaged by the engagement portion 60d of the hose fastening fitting 60 and the second contact surface 68c of the bushing 68 is engaged by the bushing contact surface 72 of the tubular insert 64, thereby causing deformation of the bushing 68 when the hose fastening fitting 60 is tightened. The bushing 68 deforms in a radial direction toward the center axis A, thereby engaging and securely retaining the first end portion 46a of hydraulic hose structure 18 to the non-metallic body 30. As shown in FIGS. 5 and 9, the tubular insert 64 prevents direct contact between the bushing 68 and the internal attachment bore 58 of the non-metallic body 30, thereby preventing plastic deformation of the internal attachment bore 58 of the non-metallic body 30. The rigidity of the bushing contact surface 72 of the tubular insert 64 prevents deformation of the bushing contact surface 72, thereby allowing repeated connections of the hydraulic hose structure 18 without degradation of the connection between the hydraulic hose structure 18 and the non-metallic body 30. Accordingly, repeated connections of the hydraulic hose structure 18 can be accomplished that are reliable and stable without a corresponding decrease in performance.

A substantially similar procedure is conducted at the second end portion 46b of the flexible tube 46 to secure the second end portion 46b to the brake caliper 16, thereby forming a fluid path between the hydraulic chamber 40 and the brake caliper 16. Thus, the detailed description of the steps of assembling of the brake caliper 16 with the second end part 46b of the hydraulic hose structure 18 will be omitted for the sake of brevity. With this assembling method, the hydraulic brake system 22 can be assembled in a relatively easy manner without air being trapped in the hydraulic brake system 22.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up" "down", "above", "below", "upward", "downward", "top", "bottom", "side", "vertical", "horizontal", "perpendicular" and "transverse" as well as any other similar directional terms refer to those directions of a bicycle in an upright, riding position and equipped with the non-metallic bracket. Accordingly, these directional terms, as utilized to describe the non-metallic bracket should be interpreted relative to a bicycle in an upright riding position on a horizontal surface and that is equipped with the non-metallic bracket. The terms "left" and "tight" are used to indicate the "right" when referencing from the right side as viewed from the rear of the bicycle, and the "left" when referencing from the left side as viewed from the rear of the bicycle.

As used herein, the following terms "ring" and "tubular" are not limited to continuous annular members or portions. Rather, the term "ring" and "tubular" as used herein refers to members having an overall "ring" configuration and includes split rings as well as rings having one or more cutouts. Likewise, the term "tubular" as used herein refers to members having an overall "tubular" configuration and includes split tubular members or portions as well as tubular members or portions having one or more cutouts.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A non-metallic bracket for a bicycle hydraulic component, the non-metallic bracket comprising:
    a non-metallic body having a hydraulic hose attachment port and an internal fluid passage, the hydraulic hose attachment port having an insertion opening disposed at an exterior surface of the non-metallic body and an internal attachment bore extending from the insertion opening towards the internal fluid passage, the internal attachment bore of the hydraulic hose attachment port including an internal screw thread portion that threadedly receives a hose fastening fitting; and
    a force receiving member, provided to the non-metallic body, so as to receive force applied to the non-metallic body in an area of the hydraulic hose attachment port caused by screwing the hose fastening fitting into the internal screw thread portion of the non-metallic body, the force receiving member including a tubular insert disposed in the internal attachment bore of the hydraulic hose attachment port, the tubular insert having a bushing contact surface that at least partially faces in an axial direction of the internal attachment bore of the hydraulic hose attachment port; wherein the bushing contact surface limits insertion of a bushing, located adjacent the tubular insert, in a direction towards the internal fluid passage.

2. The non-metallic bracket according to claim 1, wherein the force receiving member is disposed within a portion of the internal attachment bore that is between the internal screw thread portion and the internal fluid passage.

3. The non-metallic bracket according to claim 1, wherein the bushing contact surface tapers towards a center axis of the internal attachment bore in a direction away from the insertion opening.

4. The non-metallic bracket according to claim 1, wherein the tubular insert is a metallic member.

5. The non-metallic bracket according to claim 1, wherein the internal attachment bore has a deformable seal portion configured to be deformed by the tubular insert with force produced by screwing the hose fastening fitting into the internal screw thread portion of the non-metallic body.

6. The non-metallic bracket according to claim 5, wherein the deformable seal portion includes a protrusion provided on the non-metallic body.

7. The non-metallic bracket according to claim 6, wherein the non-metallic body has a step portion between the internal attachment bore and the internal fluid passage, the protrusion is provided on the step portion.

8. The non-metallic bracket according to claim 1, wherein the tubular insert has a flange portion extending radially inward towards a center axis of the internal attachment bore.

9. The non-metallic bracket according to claim 8, wherein the flange portion defines an inner surface that tapers towards the center axis in a direction away from the insertion opening.

10. The non-metallic bracket according to claim 9, wherein
the tubular insert is a continuous annular member with the bushing contact surface and the inner surface being conically shaped.

11. The non-metallic bracket according to claim 1, wherein
the force receiving member further includes a support ring disposed on a portion the exterior surface of the non-metallic body that encircles the internal attachment bore of the hydraulic hose attachment port.

12. The non-metallic bracket according to claim 1, wherein
the non-metallic body further has a gripping portion and a handlebar receiving recess disposed at an end of the gripping portion.

13. The non-metallic bracket according to claim 12, further comprising
a bracket cover overlying the gripping portion of the ion-metallic body.

14. The non-metallic bracket according to claim 13, wherein
the bracket cover is made of an elastic material.

15. The non-metallic bracket according to claim 1, wherein
the non-metallic body is made of a resin material.

16. A bicycle hydraulic actuating device including the non-metallic bracket according to claim 1, the bicycle hydraulic actuating device further comprising
an operating member movably mounted to the non-metallic bracket; and
a piston operatively coupled to the operating member, and movably disposed in a hydraulic chamber supported by the non-metallic bracket in response to operation of the operating member.

17. The bicycle hydraulic actuating device according to claim 16, further comprising
the hose fastening fitting including an external screw thread portion threadedly coupled to the internal screw thread portion of the non-metallic bracket, the external screw thread portion having a tapered portion tapering towards a center axis of the internal attachment bore in a direction away from the insertion opening.

18. A non-metallic bracket for a bicycle hydraulic component, the non-metallic bracket comprising:
a non-metallic body having a hydraulic hose attachment port and an internal fluid passage, the hydraulic hose attachment port having an insertion opening disposed at an exterior surface of the non-metallic body and an internal attachment bore extending from the insertion opening towards the internal fluid passage, the internal attachment bore of the hydraulic hose attachment port including an internal screw thread portion that threadedly receives a hose fastening fitting; and
a force receiving member, provided to the non-metallic body, so as to receive force applied to the non-metallic body in an area of the hydraulic hose attachment port caused by screwing the hose fastening fitting into the internal screw thread portion of the non-metallic body, the force receiving member including a support ring disposed on a portion of the exterior surface of the non-metallic body that encircles the internal attachment bore of the hydraulic hose attachment port.

19. The non-metallic bracket according to claim 18, wherein the support ring is a metallic member.

20. The non-metallic bracket according to claim 18, wherein the non-metallic body includes a recess on which the support ring is disposed.

21. The non-metallic bracket according to claim 18, wherein
the support ring has an axial length that is smaller than a depth of the recess such that an axial force produced by screwing the hose fastening fitting into the internal screw thread portion of the non-metallic body is not transmitted to the non-metallic body via the support ring.

* * * * *